April 20, 1965 W. M. PERRY 3,179,726
VACUUM CORRUGATOR
Original Filed April 25, 1958 2 Sheets-Sheet 1
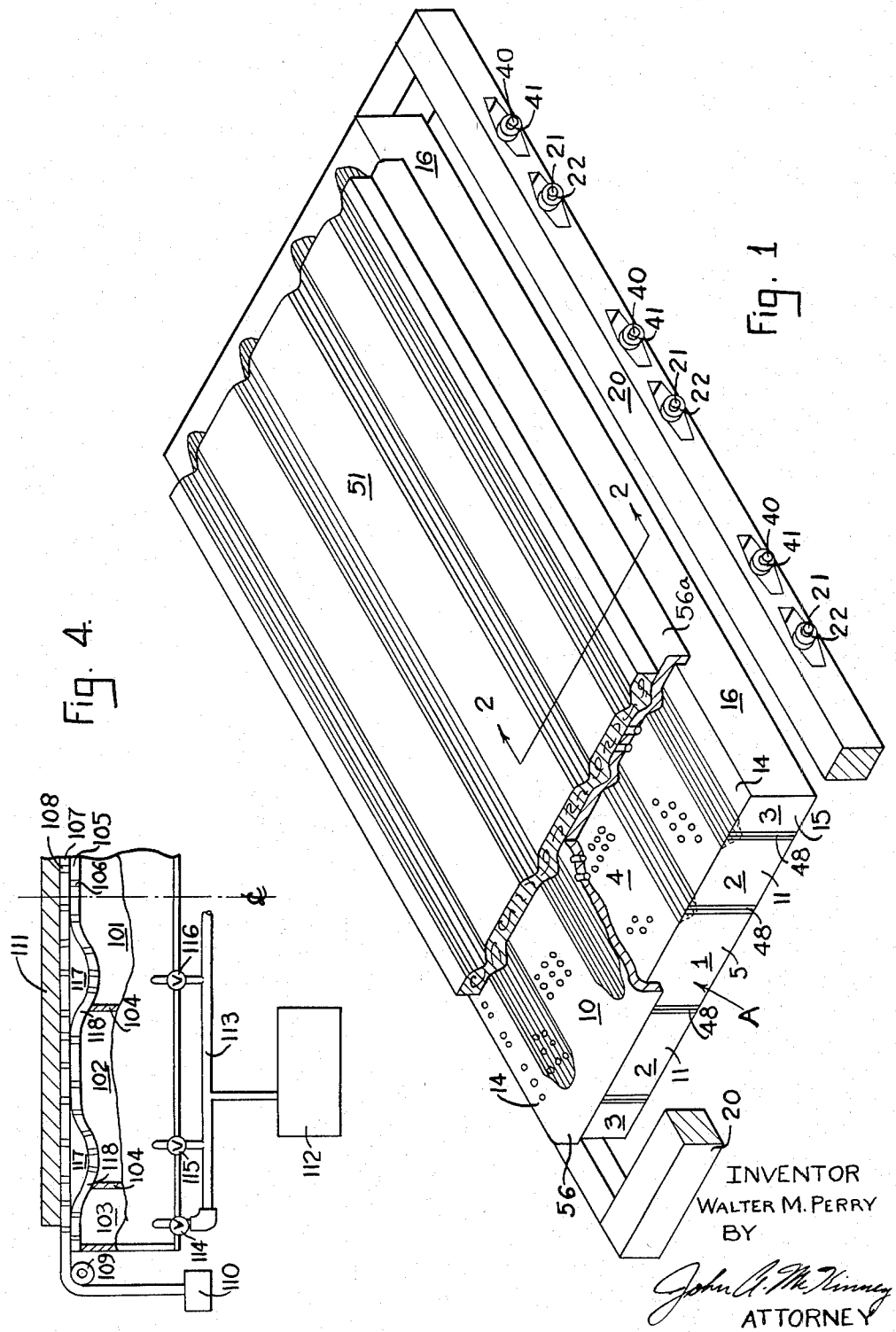
INVENTOR
WALTER M. PERRY
BY
John A. McKinney
ATTORNEY

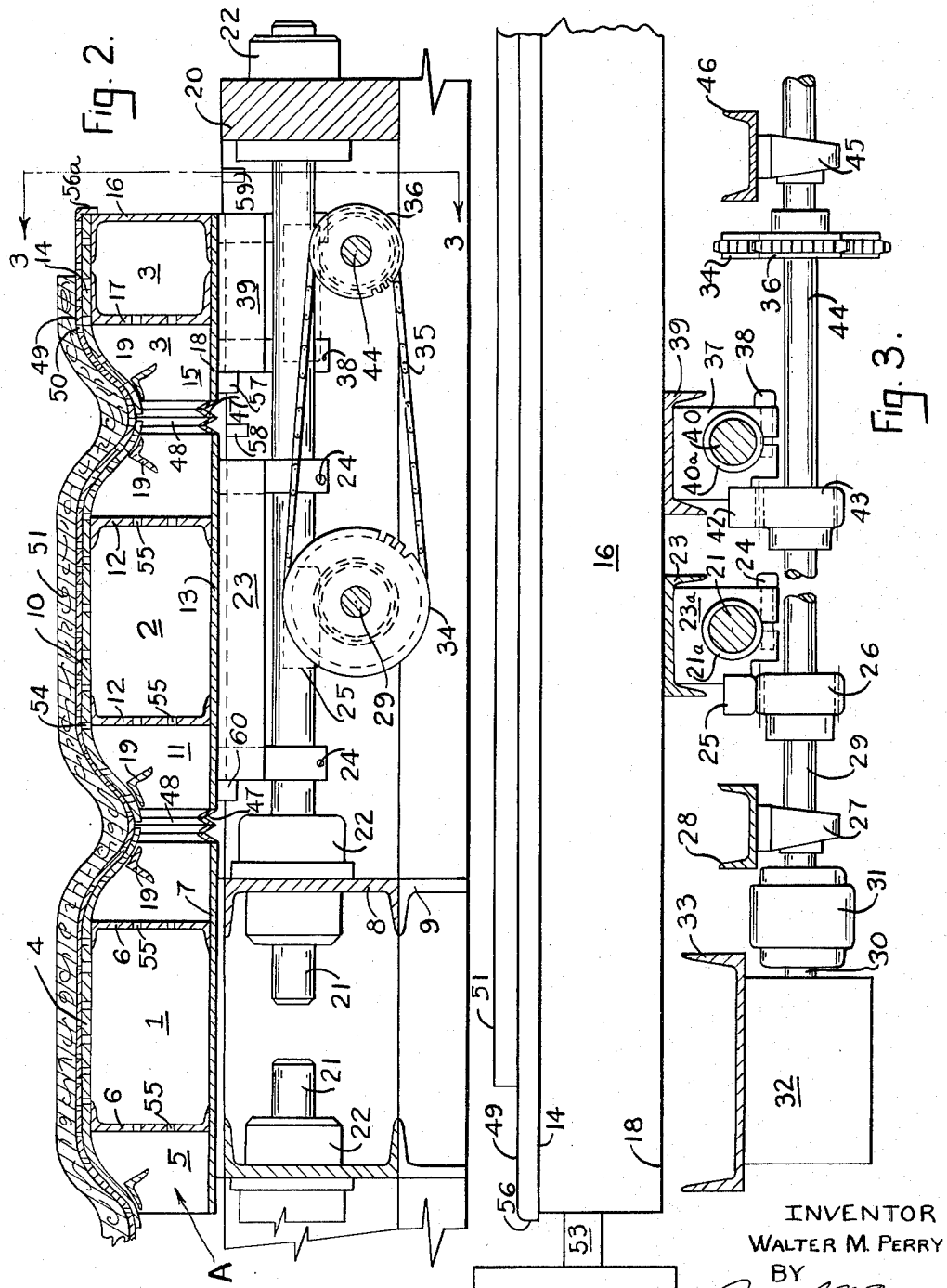

United States Patent Office 3,179,726
Patented Apr. 20, 1965

3,179,726
VACUUM CORRUGATOR
Walter M. Perry, Darien, Conn., assignor to Johns-Manville Corporation, New York, N.Y., a corporation of New York
Continuation of application Ser. No. 731,056, Apr. 25, 1958. This application Jan. 2, 1964, Ser. No. 337,977
7 Claims. (Cl. 264—90)

This is a continuation of Serial No. 731,056, filed April 25, 1958.

This invention relates to a method and apparatus for treating fiber-cement sheets and the like, and more particularly, it relates to a method and apparatus for corrugating such sheets or forming such sheets with irregular surface contours.

In forming irregular contours in plastic formative sheets, such as, for example, uncured fiber-cement sheets, the outer fibers of the sheet adjacent the curve or irregular contour are placed in tension, while the inner fibers adjacent the curve or irregular contour are placed in compression. In attempting to eliminate such tensile forces, fiber-cement sheets, or the like, heretofore have been corrugated either by gradually folding an uncured or plastic sheet over a corrugating die or form so that the sheet successively falls into the valleys or recesses of the die, and sets sufficient for handling purposes according to the irregular contour of the die, or by placing an uncured or plastic sheet completely over the die and depressing the sheet, as by rollers, into the valleys or recesses. Such methods, however, still produce weak spots in the sheets, especially in the depressions where the material has been placed in tension. Moreover, the use of rollers to produce corrugations is a slow, tedious process, and the relatively long manufacturing time is ultimately reflected in the cost of the sheet. Automatic corrugating mechanisms, such as the first mentioned prior art apparatus, have been quite complicated and costly to build.

An object of this invention is to provide a novel method and apparatus for forming corrugations or irregular surfaces in plastic sheets, such as, for example, fiber-cement sheets, and the like, which in their plastic, formative state are relatively weak in tension.

An additional object of this invention is to provide a novel method and apparatus for producing corrugations or irregular depressions in fiber-cement sheets and the like whereby no harmful tensile stresses are produced in the sheet, especially with regard to the corrugations or depressions, during the formation of such irregularly contoured sheets.

A further object of this invention is to provide an apparatus for corrugating asbestos-cement sheets and the like, which is relatively simple to operate, and is relatively inexpensive to maintain.

Broadly stated, the method and apparatus of this invention provide for producing curves in a plastic, fibrous sheet wherein the application of tensile forces in the outer fibers of the curve is restrained, and simultaneously, the fibers in the inner face areas of the curves are caused to absorb more than the usual amount of compression. Since such sheets, in their formative stage, are extremely weak in tension, the limiting of the application of tensile forces in accordance with the instant invention has made it possible to completely eliminate the formation of physical cracks or weakening of the area in and adjacent the convex surfaces of the curves formed; at the same time, the absorption of more than the usual amount of compression in the inner face area is not deleterious to the ultimate characteristics of the sheets as such compressive forces do not injure the structure of the sheets or reduce their final finished strength. The invention specifically comprises a plurality of movable corrugated die sections having a fabric-like material placed over the upper surfaces of the sections. The sheet to be corrugated is placed flat on the fabric surface, and suction apparatus within the movable sections of the dies forces the fabric and its superimposed sheet into the die depressions. During corrugation, the die sections are moved toward each other, allowing the plastic sheet to take the form of the die, and, with the assistance of the fabric, no tensile stresses are set up in the sheet corrugations. The material thus worked is of the fiber-cement type, as, for example, an asbestos-cement sheet; however, it is adaptable to other types of sheets, especially to other forms of fibrous sheets, which are difficult to shape with an irregular contour due to stresses created in the material during the forming operation.

In a modification of the above system, a die having fixed sections, rather than movable sections, is used each section having a separate suction control. The corrugations are imparted to the sheet consecutively by creation of a vacuum in the sections serially; this permits feeding of the fabric and plastic sheet to the immediate section in which a vacuum is established from the sections that are remaining at atmospheric pressure.

The foregoing and other objects will be readily apparent from the following, more detailed description with reference to the attached drawings, wherein:

FIG. 1 is a schematic pictorial view of the corrugating die system, with certain parts omitted for clarity;

FIG. 2 is a cross-sectional view, along lines 2—2 of the device of FIG. 1;

FIG. 3 is a detailed, cross-sectional side view, with certain parts broken away, along sectional lines 3—3 of FIG. 2; and FIG. 4 is a cross-sectional view, in part, of a modification of the apparatus illustrated in FIGS. 1–3.

Referring to the drawings, the corrugating apparatus comprises a die A having a plurality of longitudinally extending die boxes 1, 2, and 3 with the center box 1 being fixed and boxes 2 and 3 being mounted for lateral movement toward and away from the center box. The boxes 2 immediately adjacent the center box are known, as side boxes, and the boxes 3 most distant from the center box are termed the end boxes. The system is symmetrical with respect to a longitudinal center line, consequently, only one-half of the system is illustrated in FIG. 2, and specifically described hereinafter. It is to be understood however, that the description, confined, for the most part, to the one-half illustrated in FIG. 2 is also applicable to the symmetrical other one-half not specifically described or specifically illustrated.

The center box 1 comprises an upper perforated metallic sheet 4 held in position by end plates 5 and a lower section 7, comprising the floor of the center box, and a pair of reinforcing channel members 6 extending between the end plates 5. The upper surface 4 has a flat central portion, while the side end portions of the surface are depressed toward the bottom 7 of the box to form one-half of a corrugating depression on either side of the box. The entire center box is supported by a pair of longitudinal reinforcing members 8 welded to a rectangular frame 20 circumscribing the entire die. The frame 20 and support members 8 rest upon a base 9.

Each of the side boxes 2, on each side of the center box 1, comprises an upper perforated surface 10 maintained in position by a pair of end panels 11, a bottom box section 13, and a pair of longitudinal reinforcing members 12 secured to each end panel and to the lower and upper sections of each side box. As in the center box, the upper section 10 has a central flat portion and depending side sections, the latter of which each form one-half of a depression or valley. One of the depending portions of the upper surface 10, when brought adjacent to a depending portion of the upper surface 4, combines therewith to make one complete corrugation or depression of the desired contour.

Each of the end boxes 3 comprises an upper perforated section 14 secured to end panels 15, and a longitudinal extending side panel 16. The end panels and the side panel are in turn secured to the floor panel 18, and the complete box is reinforced by a longitudinally extending reinforcing member 17. One portion of the upper surface 14 is flat and is secured to the upper edges of side panel 16, as well as to reinforcing member 17; the opposite portion is depressed and follows the contour of one-half of the desired die depression, such that when combined with a juxtapositioned depressed side portion of the upper section 10, they form a complete depression. Each of the depressed sections in each of the boxes is further reinforced or backed by an angle member 19, which prevents any downward movement of the depressed sections from atmospheric pressure during corrugating.

The side boxes 2 (FIG. 3) are supported by a plurality of transverse channel members 23 having attached thereto split spindle supports 23a. Each support receives a transverse spindle 21 slidably mounted in longitudinal bearings 21a; the support is secured to the bearings 21a by tightening of the bolt 24. With this mechanical arrangement, each support 23a is capable of sliding along its related spindle 21 thereby carrying the associated side box either toward or away from the center box. Extending at right angles and attached to each support 23a is a rack gear 25 mated with a circular gear 26 secured to a rotating side box shaft 29. Each side box has a longitudinal shaft 29 extending parallel therewith, and the pair of shafts are supported in a predetermined relation with the side boxes, with the gears 25, 26 in mesh, by a plurality of pillow blocks 27 fixed in relation to the rectangular frame 20 by a plurality of supports 28 secured to the frame 20 and to the pillow blocks. Each transverse spindle 21 is fixed relative to the frame 20 and to the supports 8 by a pair of flanged bushings 22 secured to the frame 20 and support 8, thereby preventing any transverse or longitudinal movement of the spindle.

The pair of end boxes 3 are supported by a plurality of transverse channel members 39 having attached thereto transverse split bushing types of supports 37. Each split bushing type support 37 receives a transverse end box spindle 40 supported by longitudinal bearings 40a; the support 37 is secured to the bearings by bolts 38 so that the support 37 and the attached end box 3 are capable of sliding movement along the spindle 40. Each spindle 40 is also prevented from having transverse or longitudinal movement by a plurality of bushings 41, similar to bushings 22, secured to the frame 20 and to the center box support 8. A rack gear 42 extends normal to the end box support 37 and meshes with a circular gear 43 mounted on the end box rotating shaft 44. The aligned pairs of shafts 44 are supported by a plurality of pillow blocks 45 depending from supports 46 extending between the longitudinal sides of the frame 20.

A drive motor 32 depending from support 33 provides rotation for side box shaft 29 via shaft 30 and coupling 31. Rotation of the shaft 29 in either direction produces a corresponding rotation of gear 26, and transverse linear movement of rack gear 25, support 23a, and side box 2. The shaft 29 has secured thereto a rotating sprocket 34 operatively connected to sprocket 36 by a chain drive 35. The latter sprocket is directly mounted on end box shaft 44 so that rotation of the side box shaft produces a corresponding proportional rotation of the end box shaft. The relative sizes of sprockets 34, 36 are such that one revolution of sprocket 34 would produce two revolutions of sprocket 36, i.e., the sprocket gear ratio is 2:1; actually the sprocket 34 rotates less than one full revolution due to the design of the various parts.

The boxes are sealed relative to each other by a plurality of longitudinal flexible fabric seals 47 and a plurality of transverse bellows type or fabric seals 48 closing the gaps between adjacent pairs of boxes at their bottoms and ends. A vacuum source 52 is coupled to the center box system by a conduit connector 53 so that vacuum applied to the center box evacuates the entire die box system. Adjustable stops 60, 57 limit the inward movement of the boxes, and adjustable stops 58, 59 limit the outward movement of the boxes.

A pliable sheet is stretched taut over the upper sections 4, 10, 14, which form an approximately continuous surface, and is lapped over the upper corner of the end boxes 3, as at 56a, when the side boxes and end boxes are in their outwardly extended position, and over the upper corners of panels 5, 11, 15, as at 56. A fabric excellently adapted for the purposes of this invention is a relatively thin fabric which can be perforated, and which is relatively free of stretch when subjected to the forces involved. Such a fabric is a neoprene coated glass cloth, which has the desired non-stretching characteristic. It is apparent that other types of fabrics, having the desired properties, will perform equally as well; the particular fabric recited is meant to be exemplary of the type of material that may be used and not as a limitation of the invention. Each of the upper sheets 4, 10, and 14 has a plurality of perforations 54 and the neoprene fabric 49 also has a plurality of perforations 50 therein. Thus, when vacuum is applied to the box system, the plastic sheet 51 has suction applied thereto via these ports 50 and 54. The support members 6, 12, and 17 are similarly perforated or cored with ports 55 to provide proper intercommunication between the various sections whereby the vacuum may be applied to the entire box system by the application of suction to the center box only. In the construction illustrated and described, the corrugating unit is longer than the sheet to be corrugated. The fabric is perforated within approximately a foot of each end, corresponding to the maximum length of sheet to be formed. It is difficult to corrugate a sheet to the very end of the boxes as the fabric is also sealed at the end of the boxes by curving it over and around the box end and is secured thereto. There is, therefore, a non-uniform bulge of fabric extending from each end of the apparatus a distance of six or eight inches, at the end of which the fabric straightens out to follow the contour of the corrugations. When shorter sheets are being corrugated, the perforations lying beyond the sheet itself are masked over to prevent an excessive loss of vacuum.

In the operation of the vacuum corrugating system, the side boxes 2 are at their extreme outer limits adjacent center box 1, and end boxes 3 are at their extreme outer limits adjacent side boxes 2. The fabric 49 is stretched taut over the upper surfaces 4, 10, 14, and secured by any conventional means to the boxes at 56a, 56; a plastic sheet, such as, for example, an uncured asbestos-cement sheet is superimposed thereafter upon the fabric. Vacuum is applied to the boxes from source 52 with the motors 32 holding the boxes in their extended positions. This permits a partial buildup of vacuum to force the sheet against the fabric before the plastic sheet starts to draw in. Additionally, the fabric is locked against the flat portions of the entire upper die surface so that the plastic sheet will move into the corrugations uniformly, and not have fabric enter more into one corrugation than another. The vacuum buildup is fast, and because of the atmospheric pressure against the outer faces 16 of the end boxes, the latter will tend to move in against the outward moving force of the motors 32. The motors are reversed, and the combination of the motors plus the atmospheric pressure on the outer faces 16 of the end boxes closes the unit toward stops 60, 57, and the sheet 51 gradually commences to pull in toward the contours of the curved depressed sections of the upper surfaces. The relative positions of the boxes in the system are such that the end box must travel inwardly twice the distance or at twice the rate of the side boxes. This is accomplished by the 2:1 ratio of sprockets 34, 36; thus, for each one-inch transverse travel or movement of each of the side boxes, there is a corresponding two-inch side movement of each of the end boxes. Consequently, the side boxes 2 close the gap between the side boxes and the center box until an innermost position is reached wherein approximately a complete depression is formed. Likewise, each end box not only closes the gap between the adjacent side box and itself but additionally travels the same distance as the adjacent side box traveled in closing the center-side box gap. Ultimately, the side box and the end box reach an innermost position relative to each other whereby another set of complete depressions are formed therebetween. This suction and atmospheric pressure action on the plastic sheet 51 and allowance for the depression safely permits the plastic sheet to form depressions therein whereby the depressions have no appreciable tensile stresses created therein, which stresses ordinarily create weak spots within the sheet or even cracking of the surface. Since the vacuum is applied when fabric 49 is still drawn tight across the corrugations, atmospheric pressure immediately presses the plastic sheet tight against the fabric. Therefore, as the boxes move together, and the sheet and the fabric start to draw into the depression, the fabric carries with it sufficient material of sheet 51 to exactly fill the contour and without any pull being exerted on the sheet itself to draw it into the corrugations. The corrugations are formed whereby the fibers gradually assume their new positions without any large movements of the fibers relative to each other, preventing thereby the occurrence of these stresses. Since the particles of the fabric within a corrugation adjacent the fibrous cement sheet, i.e., the particles of fabric on the concave side, are placed in compression, it is believed that this compressive force acts as a restrainer upon the fibers on the convex side of the superimposed sheet preventing them from being placed in tension. It is quite conceivable that the restraining force is not only sufficiently great to counteract any tension forces tending to stress the fibers on the convex side of a corrugation in the sheet but also places these fibers under a compression force, strengthening the outer convex side of the sheet somewhat. The soft or plastic nature of the sheet makes possible this relieving of tensile stresses as the sheet is formed with corrugations.

The corrugations having been formed in the plastic sheet 51, the vacuum within the box system is destroyed and the sheet is removed and taken to a place for further processing or air curing. The drive 32 is reversibly operated thereby bringing the side boxes and the end boxes into their original outwardly extending positions. The system is ready for another cycle of corrugating.

With the specific apparatus shown, four longitudinal corrugations can be imparted to each plastic sheet; however, the number of corrugations can be increased or decreased according to the design requirements by a modification of the apparatus according to the principles described. Likewise, the degree of side movement of one box relative to an adjacent box can be made adjustable. For any given contour and size of depression, the side movement almost exactly equals the difference in the measured distance between the length of the path of the curvature and a line drawn tangent across the top of the finished depression. As long as this relationship is approximately maintained, the size of any depression can be altered to produce sheets of almost any desired contour.

Referring to FIG. 4, it is also possible to obtain certain advantageous results, such as described with respect to the apparatus shown in FIGS. 1–3, with a fixed box system. A fixed center box 101 is straddled by a pair of fixed side boxes 102 and a pair of fixed outer end boxes 103. In view of the symmetry of the arrangement, only one-half of the cross-sectional construction has been shown, the same as in FIG. 2. The boxes are separated by dividing walls 104, and a common cover 105, having perforations 106 and a plurality of depressions 117, completes the box enclosure. The cover 105 thus has a corrugated shape, the depressions 117 forming the valleys, and the remaining portions of the cover between the depressions forming the crests of the die. A fabric 107, provided with passages or apertures 108, is superposed upon the cover 105 and extends beyond the sides of the end boxes over pulley 109, the ends of the fabric being attached to weights 110. The fabric may be of the same type as used in the movable box system previously described. Thus the fabric is placed in slight tension, the extent of which is determined by the size of weights used. Plastic sheet 111 is superimposed upon the fabrics, also as previously described. In this modified construction, each box is connected to a common vacuum source 112 by a ducting arrangement 113; valves 114, 115, and 116 provide individual vacuum control for each of the boxes shown. Of course, other similar valves are provided for the boxes of the other half of the apparatus, not shown. Also, in this modified construction the perforations 106 do not extend across the entire effective working area of the sheet. Wall areas 118 of the depressions 117, away from the longitudinal center line of the system, are left imperforate; those areas of the depressions 117, closest to the center line of the system, are perforated in the usual manner.

In the operation of this apparatus, described with respect to the half of the apparatus shown, valves 114, 115, and 116 are closed; the fabric 107 is superposed upon the cover 105, and the weights 110 are attached to the overhanging fabric ends. This places the fabric taut on the surface 105, but it is yieldable in response to a force greater than the force exerted by the weight 110. The plastic sheet 111 is superimposed upon the fabric. Valve 116 is opened, thereby causing evacuation of the air in box 101. Since wall area 118 of the adjacent depression 117 is imperforate, atmospheric pressure forces the fabric 107 and sheet 111 toward the opposite wall area. Consequently, the fabric is pulled into the depression, causing the fabric and sheet to slide toward the center of the box system, thereby lifting weight 110 a slight amount. This action continues until the fabric completely follows the contour of the depression; simultaneously, the plastic sheet supported on the fabric follows the movement of the fabric. After the first depression has been formed in the sheet, valve 115 is opened, thereby applying suction to box 102. A second corrugation, similar to the first, is formed in the sheet adjacent this box 102. The valve 114 then may be opened, applying suction to box 103 and causing the fabric to be drawn against the cover 105 to ensure that the end portion of the plastic sheet assumes the desired shape. The thus formed sheet 111 is mated with a vacuum hoist system simultaneous with the closing of valves 115 and 116 and the destroying of the vacuum within the boxes; the sheet is then removed from the die for further processing or air curing. Weight 110 pulls the fabric back to its "at rest" position, and the system is ready for another cycle of operation. Thus, the fibrous-cement sheet is corrugated by sequentially exposing adjacent portions of the fabric on which it is supported to a suction force greater than the tensioning force acting thereon.

Having thus described the invention in rather full detail, it will be understood that these details need not be strictly adhered to and that various changes and modifications may suggest themselves to one skilled in the art, all falling within the scope of the invention as defined by the subjoined claims.

What I claim is:

1. A method of corrugating a plastic fibrous-cement sheet on a perforated die having crests and valleys, comprising the steps of:

(1) placing an air pervious, substantially nonstretchable, flexible sheet over the die surface,
(2) applying a tensioning force to the sheet in a direction transversely of the direction of the crests and valleys, the tensioning force holding the sheet taut across the die crests but permitting, in response to sufficient force exerted transversely of the sheet and on a portion of the sheet adjacent a die valley, simultaneous movement of the taut sheet over the die crests in a direction opposite to the tensioning force and movement of said portion of the sheet toward the die valley,
(3) placing a plastic fibrous-cement sheet on the taut flexible sheet, and
(4) applying suction to a predetermined valley of the die, the force of the suction overcoming the tensioning force, whereby a portion of the flexible sheet and the fibrous-cement sheet supported thereon are drawn into the valley to conform to the shape thereof.

2. A method of corrugating a plastic fibrous-cement sheet on a perforated die having crests and valleys, comprising the steps of:
(1) placing an air pervious, substantially nonstretchable, flexible sheet over the die surface,
(2) applying a tensioning force to the sheet in a direction transversely of the direction of the crests and valleys, the tensioning force holding the sheet taut across the die crests but permitting, in response to sufficient force exerted transversely of the sheet and on a portion of the sheet adjacent a die valley, simultaneous movement of the taut sheet over the die crests in a direction opposite to the tensioning force and movement of said portion of the sheet toward the die valley,
(3) placing a plastic fibrous-cement sheet on the taut flexible sheet,
(4) applying suction to a predetermined valley of the die, the force of the suction overcoming the tensioning force, whereby a portion of the flexible sheet and the fibrous-cement sheet supported thereon are drawn into the valley to conform to the shape thereof, and
(5) applying suction to an adjacent valley of the die, the force of the suction overcoming the tensioning force, whereby a portion of the flexible sheet and the fibrous-cement sheet supported thereon adjacent the first formed corrugation are drawn into the adjacent valley to conform to the shape thereof.

3. A method of corrugating a plastic fibrous-cement sheet on a perforated die having crests and valleys, comprising the steps of:
(1) placing an air pervious, substantially nonstretchable, flexible sheet over the die surface,
(2) applying a tensioning force to the sheet in a direction transversely of the direction of the crests and valleys, the tensioning force holding the sheet taut across the die crests but permitting, in response to sufficient force exerted transversely of the sheet and on a portion of the sheet adjacent a die valley, simultaneous movement of the taut sheet over the die crests in a direction opposite to the tensioning force and movement of said portion of the sheet toward the die valley,
(3) placing a plastic fibrous-cement sheet on the taut flexible sheet, and
(4) evacuating air from the space between the flexible sheet and a predetermined valley,
(5) the suction force created by the evacuation overcoming the tensioning force, whereby a portion of the flexible sheet and the fibrous-cement sheet supported thereon are drawn into the valley to conform to the shape thereof.

4. A method of corrugating a plastic fibrous-cement sheet on a perforated die having crests and valleys, comprising the steps of:
(1) placing an air pervious, substantially nonstretchable, flexible sheet over the die surface,
(2) applying a tensioning force to the sheet in a direction transversely of the direction of the crests and valleys, the tensioning force holding the sheet taut across the die crests but permitting, in response to sufficient force exerted transversely of the sheet and on a portion of the sheet adjacent a die valley, simultaneous movement of the taut sheet over the die crests in a direction opposite to the tensioning force and movement of said portion of the sheet toward the die valley,
(3) placing a plastic fibrous-cement sheet on the taut flexible sheet,
(4) evacuating air from the space between the flexible sheet and a first predetermined valley, and then sequentially evacuating air from the space between the flexible sheet and adjacent valleys, the suction force created by the evacuations overcoming the tensioning force to cause the flexible sheet and the fibrous-cement sheet supported thereon to be drawn, first into the predetermined valley and then sequentially into adjacent valleys corresponding to the sequential evacuation of air, whereby both sheets conform to the configuration of the die.

5. A method of corrugating a plastic fibrous-cement sheet as recited in claim 4, wherein the air permeable, substantially nonstretchable flexible sheet is a sheet of fabric.

6. A method of corrugating a plastic fibrous-cement sheet as recited in claim 4, wherein the flexible sheet is tensioned by weighting the ends thereof.

7. Apparatus for corrugating a plastic fibrous cement sheet, comprising
(a) a corrugated die having crests and valleys,
(b) the die having a plurality of perforations extending therethrough,
(c) an air pervious flexible sheet overlying the die,
(d) means for tensioning the flexible sheet to hold the sheet taut across the crests of the die, the sheet in its taut condition being adapted to support a plastic fibrous-cement sheet,
(e) a plurality of compartments on the side of the die opposite the flexible sheet,
(f) the perforated die surface forming a cover for the compartments, and
(g) means for sequentially creating a vacuum in the compartments,
(h) the force exerted on the flexible sheet by the vacuum applied to the compartments being greater than the tensioning force on the sheet to cause the flexible sheet, with the plastic fibrous-cement sheet supported thereon, to move toward the die valley corresponding to the compartment in which the suction is applied.

References Cited by the Examiner

UNITED STATES PATENTS

| | | | |
|---|---|---|---|
| 1,450,222 | 4/23 | Pattison | 264—286 |
| 1,587,462 | 6/26 | Adams et al. | |
| 2,297,504 | 9/42 | Salvaneschi | 264—71 |
| 2,493,439 | 1/50 | Braund. | |
| 2,586,481 | 2/52 | Rooksby et al. | 264—286 XR |
| 2,655,196 | 10/53 | Magnani | 18—19 XR |
| 2,670,501 | 3/54 | Michiels | 264—90 |

FOREIGN PATENTS 1,101,257  3/61  Germany.

ROBERT F. WHITE, Primary Examiner.

ALEXANDER H. BRODMERKEL, Examiner.